E. F. HATHAWAY.
SHIFTING MECHANISM FOR POWER DRIVEN MACHINES AND MEANS FOR SIMULTANEOUSLY APPLYING A BRAKE.
APPLICATION FILED MAR. 30, 1906.

1,190,761.

Patented July 11, 1916.
2 SHEETS—SHEET 1.

Witnesses
Charles A. Corrigan
Ida D. Berry

Inventor
Edgar F. Hathaway

E. F. HATHAWAY.
SHIFTING MECHANISM FOR POWER DRIVEN MACHINES AND MEANS FOR SIMULTANEOUSLY APPLYING A BRAKE.
APPLICATION FILED MAR. 30, 1906.

1,190,761.

Patented July 11, 1916.
2 SHEETS—SHEET 2.

UNITED STATES PATENT OFFICE.

EDGAR F. HATHAWAY, OF BOSTON, MASSACHUSETTS, ASSIGNOR TO AMERICAN WARP-DRAWING MACHINE COMPANY, OF BOSTON, MASSACHUSETTS, A CORPORATION OF MAINE.

SHIFTING MECHANISM FOR POWER-DRIVEN MACHINES AND MEANS FOR SIMULTANEOUSLY APPLYING A BRAKE.

1,190,761.   Specification of Letters Patent.   Patented July 11, 1916.

Application filed March 30, 1906. Serial No. 308,905.

*To all whom it may concern:*

Be it known that I, EDGAR F. HATHAWAY, a citizen of the United States of America, residing at Boston, in the county of Suffolk and Commonwealth of Massachusetts, have invented certain Improvements in Shifting Mechanism for Power-Driven Machines and Means for Simultaneously Applying a Brake, which improvements are especially applicable to warp-drawing machines, of which the following is a specification.

This invention relates to means connected with the power shifting lever by which its operation will simultaneously shift the power, by changing the driving belt or clutch mechanism, and also apply and release a brake, more particularly as employed in warp-drawing machines in connection with other improvements appertaining to the operation of the shifting mechanism, and consisting of means which connect the power shifting mechanism with brake mechanism by which the two will operate simultaneously, also in devices such as a spring, which will automatically release the brake without shifting the power, as soon as the operator ceases to exert pressure upon the shifting lever, and further, in means by which a horizontal shifter bar may be raised or lowered in its horizontal position and continuously retain its connection with the shifted lever, together with some details which are set forth in the following description and specified in the claims.

The shifter rod herein shown and its operation are the same as that described and shown in Patent No. 871,681 to Field and Hathaway.

Figures 1, 3:
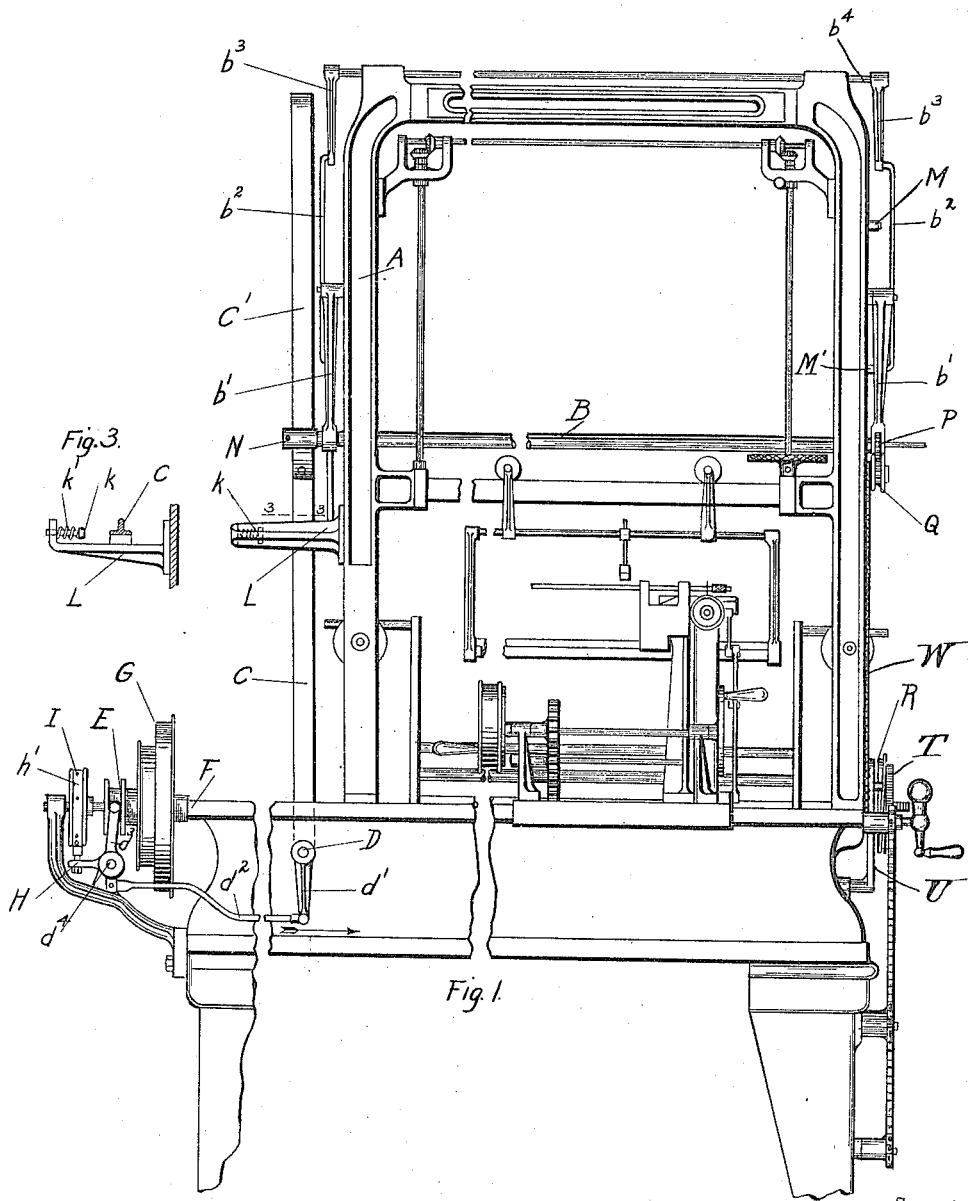
Figure 2:
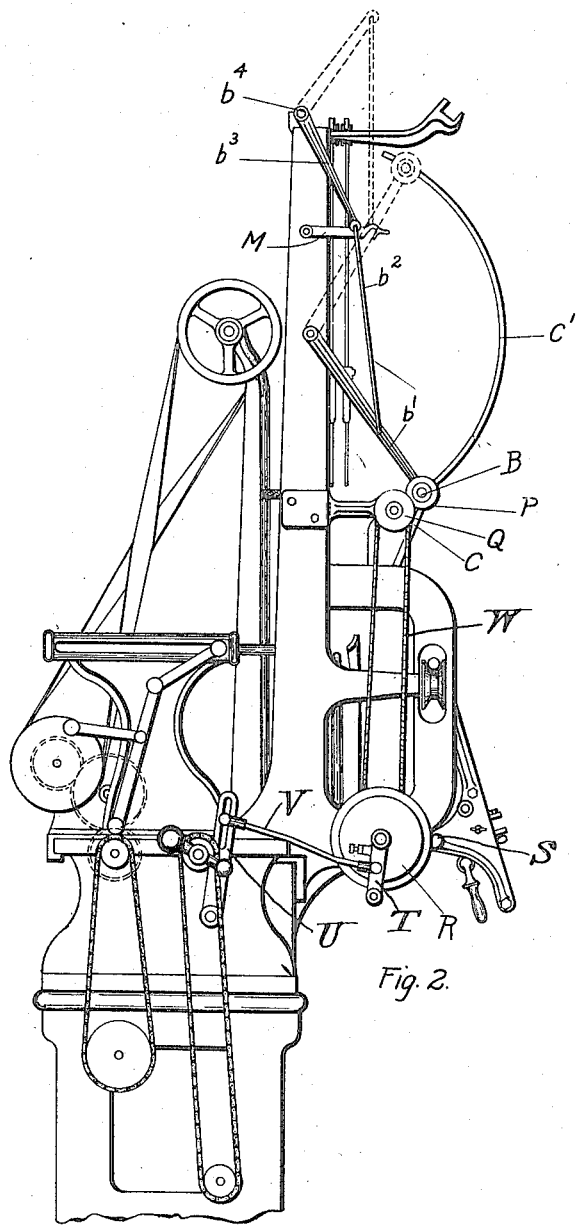

In the accompanying drawings in which the improvements are shown as applied to a warp-drawing machine, Figure 1 is a front elevation of the machine; Fig. 2 is an end elevation; Fig. 3 is a detail plan view of a bracket and a spring thereon by which the shifter lever is moved back sufficiently to release the brake, but without applying power to the machine, the frame and the shifter-lever in section on line 3—3, Fig. 1.

Referring to the drawings, A is the frame of a warp-drawing machine, B the shifter-rod, C the shifter-lever provided with a curved upper portion C'. The lower end of the lever C is secured upon a shaft D and through a crank arm $d'$ thereon, a connecting rod $d^2$, a yoke-lever $d^3$ pivoted at $d^4$, a clutch operating spool E is caused to slide back and forth upon the driving shaft F and thus operate clutch mechanism G by which power is thrown on and off the machine. Upon shaft $d^4$ is also secured a crank arm H attached to a strap $h'$ which passes around a brake pulley I, whereby when the shifter-lever C is moved to the left, the crank-arm $d'$ will be moved to the right, or in the direction of the arrow, (see Fig. 1), and thus move the spool E to the left, release the clutch and at the same time throw the crank arm H downward and draw the strap $h'$ closely around the pulley I and act as a brake to stop the machine.

Attached to the frame of the machine is a bracket L arranged near to and parallel with the path of movement of the shifter-lever C. In an offset at the end of this bracket and in line with the path of movement of the lever C is a pin $k$ adapted to slide in a hole in such offset and held therein by a head at one end and a nut at the other. A spring $k'$ is interposed between the head of the pin $k$ and the bracket L by which the pin is held extended out toward the lever C, and when that lever is swung outward so as to strike the pin $k$ it will compress the spring $k'$ at the same time that the power is released and the brake applied. As soon, therefore, as the operator ceases outward pressure upon the lever C, the spring $k'$ will push the lever C back a short distance, sufficiently to release the brake at I, but not enough to again apply power to the machine. By this means the operator is enabled to turn the machine by hand for the purposes of adjustment or regulation for any purpose.

The shifter-rod B is hung upon a pair of arms $b'$ pivoted to the frame of the machine, and upon these arms the shifter-rod may be swung up and down in its horizontal position across the machine, and for the purpose of imparting a uniform movement to both ends of the rod B when moved up and down the arms $b'$ are connected by rods $b^2$ with the ends of a second pair of arms $b^3$, which are each secured to the same rod $b^4$, which extends across the top of the machine, so that when the arms $b'$ are raised through the connecting rods $b^2$ the upper arms $b^3$ will also be raised, and when the rod B is in its highest position a latch M is provided which will engage a projection upon one of the arms b' and hold it there with the bar B. Upon the end of the bar B at the side upon which the lever C is located is a clasp or guide N which engages the shifter-lever and is adapted to slide over it when the shifter-rod is raised or lowered, and by this means the shifter-lever may be operated, whatever the position of the shifter-rod may be.

Between the lowest and highest positions which the shifter-rod may occupy the shifter-lever is formed in a curve corresponding to that through which the shifter-rod moves when raised and lowered, as illustrated at C in Fig. 2. The object of raising the shifter bar B is to give space for the manipulation of the harnesses for their insertion or removal. Upon the end of the shifter-bar B opposite to the location of the shifter-lever C a pinion P is secured, which when the bar is in its lowest or normal position engages a gear Q upon a stud projecting from the frame of the machine, and this gear Q is operatively connected with the worm R by which the warp-frame is fed or adjusted longitudinally.

The shifter-bar B is adapted to be rotated by the hand of the operator, and thus through the gear Q and its connection with the worm R the warp-frame may be adjusted by the hand of the operator independently of the automatic adjustment given to it when the machine is in operation. The warp frame is automatically adjusted step-by-step and in a direction lengthwise the machine by means of the worm R which engages rack teeth on the rod S secured to the carriage. The worm is fixed to a ratchet, the latter being moved step-by-step by a pawl carried on the lever T which lever is connected to the rock lever U by the link V. The parts are so adjusted that the movement of the pawl gives the required incremental adjustment of the machine frame. If the operator finds at any time that the warp needs to be shifted to either side of the position given it by the automatic positioning mechanism, he can turn the shifter rod in one direction or the other and thereby through the gear Q and its sprocket chain connection W to the worm can shift the warp frame manually, independent of the pawl.

The extension of the shifter-lever C above the lowest or normal position of the shifter-rod B is not a necessity in all cases, for only in exceptional instances will there be occasion to start and stop the machine by means of the shifter-rod while it is out of its normal position, and other means are provided by which the machine may be operated by hand when the power is thrown off.

I claim:

1. In a warp drawing machine the combination with a warp support and drawing-in devices of shifting devices for the driving mechanism, means connecting the shifting devices with a brake for the machine by which the operation of the shifter to release the power will apply the brake and means which automatically release the brake without applying the power.

2. In a warp-drawing machine, a shifter-rod supported on pivoted arms upon which the rod may be raised and lowered, means upon the rod which engage and are adapted to slide upon the shifter lever, by which that lever may be operated in any position of the shifter-rod.

3. In a warp-drawing machine, a shifter-rod normally in engagement with the shifter-lever and adapted to be raised and lowered in its horizontal position, and means to engage and retain the rod in its raised position.

4. In a warp-drawing machine, a shifter-rod adapted to be raised and lowered in its horizontal position, means upon the rod which are adapted to slide upon the shifter-lever and engage it in any position of the rod, and means to retain the rod in its raised position.

5. In a warp-drawing machine, a shifter-rod supported on pivoted arms upon which the rod may be raised and lowered in its horizontal position, other pivoted arms secured to a transverse rod and respectively connected with the shifter-rod supports and adapted to move in unison therewith, and means upon the shifter-rod which are adapted to slide upon the shifter-lever and to engage that lever in any position of the shifter-rod.

6. In a warp-drawing machine, the combination with a warp-holding frame and mechanism to move it independently in a longitudinal direction, of a shifter-rod adapted to rotate, to slide longitudinally and to be raised and lowered in its horizontal position, a shifter-lever, means upon the shifter-rod which engage the shifter-lever and slide thereon in all positions of the rod, and means to operate the warp-frame moving mechanism, which means are engaged and adapted to be operated by the shifter-rod when it is in its lowest or normal position.

7. A machine for operating upon warp threads comprising a warp holding frame mounted for adjusting movement upon its support with reference to means for operating in succession upon the warp threads held therein, shifting devices for the driving mechanism, a brake for the machine and a common operating member for adjusting the support and operating the shifting devices and brake.

8. A machine for operating upon warp threads comprising a warp holding frame mounted for adjusting movement upon its support with reference to means for operating in succession upon the warp threads held therein, an adjusting member for said frame, shifting devices for the driving mechanism also operated by said adjusting member, a brake for the machine, means connecting the shifting devices with said brake whereby the operation of the shifter to release the power will apply the brake, and means which automatically releases the brake without applying the power.

9. A machine for operating upon warp threads comprising a warp holding frame mounted for adjusting movement upon its support with reference to means for operating in succession upon the warp threads held therein, a shifter rod, pivoted arms whereon the same is mounted to be raised and lowered, a shifter lever, and means upon the rod which engages the shifter lever, whereby such lever may be operated in any position of the shifter rod.

10. A machine for operating upon warp threads comprising a warp holding frame mounted for adjusting movement upon its support with reference to means for operating in succession upon the warp threads held therein, a shifter rod normally in engagement with the shifter lever and adapted to be raised and lowered in its horizontal position, and means to engage and retain such rod in its raised position.

11. A machine for operating upon warp threads comprising a warp holding frame mounted for adjusting movement upon its support with reference to means for operating in succession upon the warp threads held therein, a shifter rod adapted to be raised and lowered in its horizontal position, means upon the rod adapted to slide upon the shifter lever and to engage it in any position of the rod, and means to retain the rod in its raised position.

12. A machine for operating upon warp threads having means for adjusting the position of the warp threads relatively to the drawing needle, and means accessible to the operator at any position lengthwise the machine for manually controlling such adjusting means, said controlling means being capable of vertical displacement.

13. A machine for operating upon warp threads having a thread-taking device, means for actuating the same, a warp thread support, means for shifting the relation of the thread-taking device and the warp thread support and a controlling member movable to actuate said shifting means, said member having also a separate movement to displace the same and facilitate access to the machine.

14. A machine for operating upon warp threads having a manually actuated controlling rod extending longitudinally the machine, power actuated driving means, connections between the same and the rod, and means permitting the vertical displacement of said rod.

15. A machine for operating upon warp threads having means for adjusting the position of the warp relatively to the operative parts on the machine, means for applying power to said machine, a brake and a single controlling member having two movements, one of which effects control of the power and the brake and the other the control of said adjusting means.

16. A machine for operating upon warp threads having means for applying power to the machine, a brake, a warp support, a thread taking device, and manual means for controlling said power-applying means and said brake and also for shifting the relation between the warp support and the thread taking device, said manual means being accessible to the operator at a plurality of positions lengthwise the machine.

17. A starting and stopping device for warp-drawing machines or the like having a controlling member located longitudinally of the machine and acting to effect the starting and stopping of the machine and also the hand adjustment of the warp threads relatively to the thread-taking devices, a brake also controlled by said member, and means following the stoppage of the machine and application of the brake through the movement of said member, permitting the release of said brake and the continued stoppage of said machine.

18. In a machine for treating warp threads the combination with a brake $h'$, of a warp drawing frame, shifting devices F and G and the shifter C connected to the brake to the warp frame and to the shifting devices.

EDGAR F. HATHAWAY.

Witnesses:
 REUBEN L. ROBERTS,
 FLORENCE A. COLLINS.

Copies of this patent may be obtained for five cents each, by addressing the "Commissioner of Patents, Washington, D. C."